Sept. 20, 1955   B. G. WALTERS   2,718,102
GRINDER IMPROVEMENT
Filed Oct. 25 1954
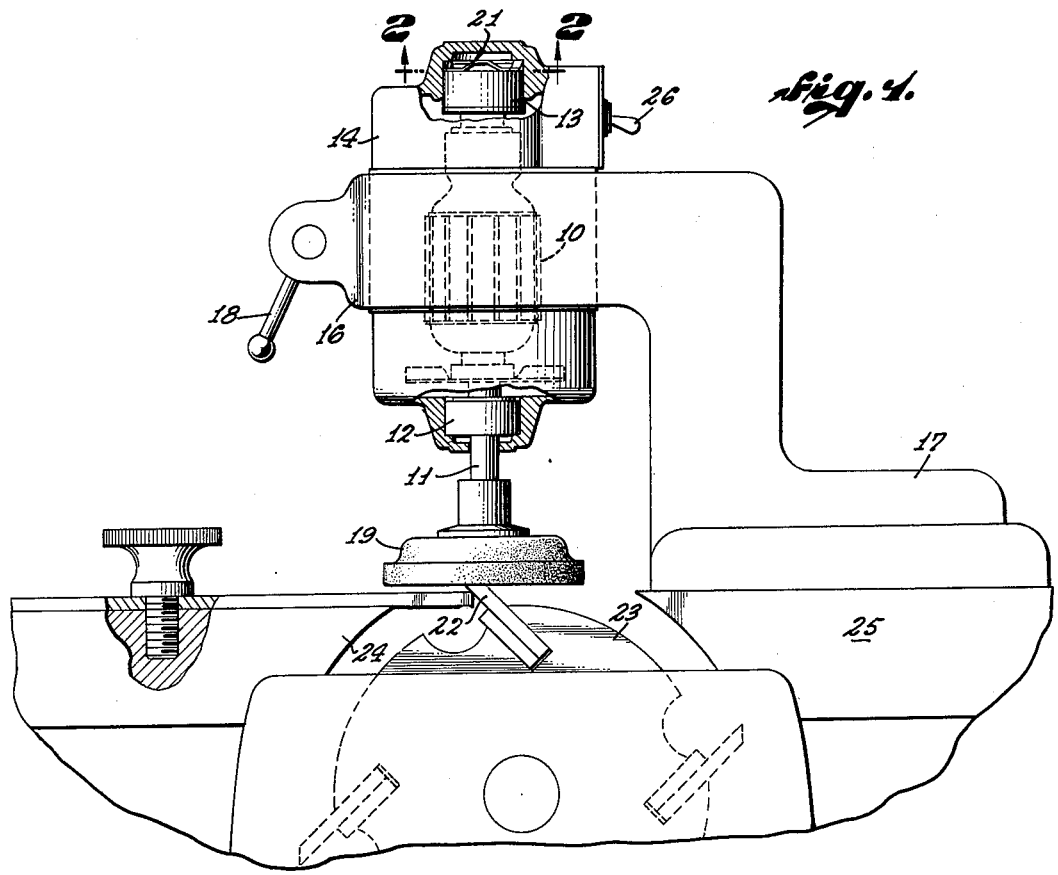
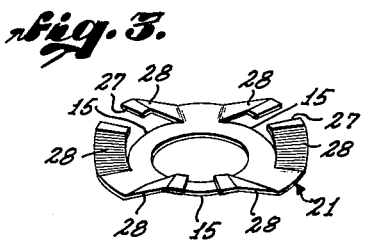
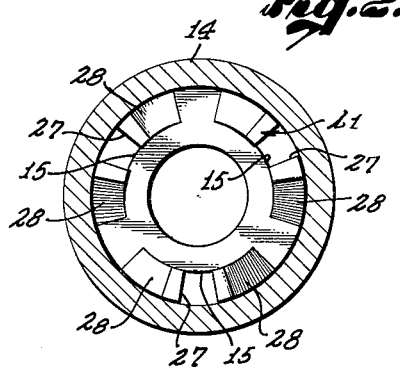
Bruce G. Walters.
INVENTOR.
HUEBNER, BEEHLER,
WORREL & HERZIG,
ATTORNEYS.
BY
Albert M. Herzig

United States Patent Office 2,718,102
Patented Sept. 20, 1955

2,718,102

GRINDER IMPROVEMENT

Bruce G. Walters, Los Angeles, Calif.

Application October 25, 1954, Serial No. 464,313

1 Claim. (Cl. 51—173)

The present invention relates to a grinder for sharpening knives, and in particular to a portable grinder for sharpening straight cutting edges of knives of woodworking machines.

It is an object of my invention to provide a grinder which will automatically grind metals of knives to the desired degree without burning the same.

Another object is to provide a knife grinder capable of automatically sharpening knives by the application of controlled pressure to the grinder on the knife to sharpen without burning.

An additional object is the provision of an improved portable knife grinder for grinding straight cutting edges on knives of woodworking machines.

Broadly stated, my present invention, which represents an improvement over my U. S. Patent No. 2,549,147 issued April 17, 1951, comprises the provision of a thrust spring in a motor-driven grinder, adapted to act on the shaft of the grinder motor for the application of controlled pressure to the grinder sufficient for grinding metals, such as steel, without burning the metal.

A more detailed description of my invention is given with reference to the drawings, wherein:

Figure 1 is a side elevational view showing a portable grinder of the invention positioned on a jointer for sharpening the blades in the cutter head thereof;

Figure 2 is a cross-sectional view taken on line 2—2 of Figure 1 showing a thrust spring mounted on the end of the grinder motor shaft; and Figure 3 is a detail perspective view showing the thrust spring.

A grinder motor assembly consisting of a movable armature 10, shaft 11 and bearings 12 and 13 on the ends of the shaft 11, are shown in Figure 1 enclosed in a motor housing 14. The grinder motor assembly is movable within the housing 14, but the latter is held in a fixed position in clamp 16. The clamp 16 is provided with a heavy base portion 17 and a hand screw 18 for tightening the jaws of the clamp. The clamp and motor assembly is movable as a unit but the base of the clamp 17 is sufficiently weighted to hold the grinder motor assembly in a vertical position.

The lower end of shaft 11 is provided with a grinder wheel 19 attached to the end of the shaft as indicated. At the upper end of the shaft 11, between the upper bearing 13 and the bearing housing there is inserted a thrust spring 21. The spring 21 is loaded with a predetermined load and is made of such design and construction that it will apply sufficient controlled pressure to move the total assembly of the armature 10, shaft 11 and bearings 12 and 13 downward within the housing 14 and at the same time apply a predetermined controlled pressure against the grinder 19 and on a knife edge 22 being sharpened by the revolving grinding action of the grinder. This pressure is so predetermined that grinder 19 will grind the knife edge without burning the same. In this manner the arbitrary judgment of a grinder operator is eliminated and an automatic device is substituted to apply a predetermined pressure of the grinder wheel 19 against the knife edge being sharpened.

A heavy cut is started by placing the grinder wheel 19 in the proper position above the unsharpened knife edge of knife 22. The entire armature, shaft and bearings assembly is forced upward in the motor housing 14 by the reaction of the edge of knife 22 against the wheel 19. The grinding action is commenced by flipping toggle switch 26, and as grinding progresses the spring 21 continues to press against bearing 13 to apply pressure to wheel 19 until it locates itself again in the original position before starting the cut.

A particular design of thrust spring 21 is shown in Figure 3, and Figure 2 shows the manner in which the spring is fitted around the end of shaft 11 between the bearing 13 and the bearing housing. The specific thrust spring or washer 21 shown is provided with a circular aperture dimensioned sufficiently to snugly fit around the shaft 11. Three concentric arcs 15 are formed in the spring washer as best shown in Figure 3 and a radial cut 27 is made approximately midway on each of the resulting arcuate sections of the spring washer. The six resulting strip portions 28 of the washer are formed at an angle to the plane of the washer and the ends of the strips 28 are formed to provide a portion thereof parallel with the plane of the washer 21. The strip portions thus formed are resilient and act as compression spring members when the washer is mounted at the end of the shaft 11 between the bearing 13 and the bearing housing under a compression load. This load supplies the desired pressure of the grinder 19 acting against the knife edge 22.

Although a particular spring washer design has been illustrated in the drawings and described in the specification, it is to be understood that other designs and configurations of spring washers or other thrust springs can be used in combination with the grinding motor assembly to apply the required pressure to the movable assembly in the fixed housing.

In operating the grinder of the invention, for the purpose of sharpening blades of a jointer for example, the rotatable head 23 containing the knife blades 22, the forward table 24 and the rearward table 25 are brought into proper alignment. The cutting head 23 then is blocked in position for the purpose of grinding one of the blades 22. The portable grinder, consisting of the motor assembly and clamp is placed on the rear table of the jointer. The grinding wheel 19 is brought into engagement with the cutting edge of the blade 22, as shown in Figure 1. At the start of a heavy cut the armature, shaft and bearings are forced upward in the motor housing, and the thrust spring 21 applies the proper pressure of the grinder wheel 19 on the blade 22. The grinding operation is commenced by snapping on switch 26 and as grinding is completed the compression spring will continue to press downward until it locates itself again in the original position it occupies before starting the cut. The motor and clamp assembly and grinding wheel 19 is then moved along the cutting edge of the blade 22 by the operator to start a new cut. This cycle of operations is repeated until a blade is satisfactorily sharpened. Each blade is in turn sharpened in this manner until all the blades contained in the cutting head 23 are sharpened.

In the above description the automatic grinder device of the invention has been described in connection with the grinding of the blades of a jointer. It will be understood however that the grinder of the invention can be used to sharpen the knives of woodworking machines in general and in addition it can be used to service many other types of cutting machines having straight edge cutting knives. It will also be understood that many variations in the design and details of the thrust spring can be made. Furthermore, the thrust spring can be incorporated in the motor assembly in various ways, such as by having it located at either end of the shaft or outside the housing of the motor frame for the purpose of applying pressure to the grinding wheel. Variations in the design and construction of the thrust spring, and its location in the motor assembly will occur to one skilled in the art. It is, therefore, understood that the foregoing description is explanatory only, and given to specifically illustrate a particular embodiment of the invention.

Accordingly, although a specific embodiment of the invention has been described above, it will be understood that such changes and modifications in the design, structure and details of the illustrated thrust spring mechanism and the manner of its combination with the grinder motor assembly may be made within the scope of the appended claims without departing from the spirit of the invention.

What I claim is:

An improvement in portable grinders comprising in combination a table, tool holder means in the table adapted to hold a tool to be ground above the plane of the table, a motor including a housing, means for supporting said motor on said table and above said tool holder means, knife-grinding and steadying rest means secured on said table and extending under the motor housing, adapted to position and hold the tool positioned in the tool holder means in a position below the armature shaft for grinding the same, tool grinder means on said armature shaft above said table in a position to grind such tool, and the improvement comprising said armature being axially movable in the housing, fixed abutment means between the housing and the armature for limiting the downward movement of the armature shaft below the housing, a spring normally urging said armature shaft to said limit of downward movement, said armature shaft tool grinder means being adapted for upward movement against the normal tension of said spring as a cushion in response to an upward thrust against the tool grinder means in excess of weight of the armature shaft tool grinder means, and said tool holder means being selectively movable under said tool grinder means for selectively removing and introducing tools to said grinder means and against said knife-grinding and steadying rest means.

References Cited in the file of this patent

UNITED STATES PATENTS

| | | |
|---|---|---|
| 1,639,684 | Bott | Aug. 23, 1927 |
| 1,826,415 | Bragg | Oct. 6, 1931 |
| 2,432,982 | Braddon | Dec. 23, 1947 |
| 2,549,147 | Walters | Apr. 17, 1951 |
| 2,683,228 | Schaefer | July 6, 1954 |

FOREIGN PATENTS

| | | |
|---|---|---|
| 20,457 | France | Nov. 3, 1917 |